US010236029B2

United States Patent
Bhat et al.

(10) Patent No.: US 10,236,029 B2
(45) Date of Patent: Mar. 19, 2019

(54) VIDEO EDITING SYSTEM WITH MAP-ORIENTED REPLAY FEATURE

(71) Applicant: Polaris Wireless, Inc., Mountain View, CA (US)

(72) Inventors: Mitul Bhat, Sunnyvale, CA (US); Padmadevan Chettiar, Sunnyvale, CA (US); Pratik Dhebri, San Jose, CA (US); Greg Edwards, Fremont, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 31 days.

(21) Appl. No.: 14/928,963

(22) Filed: Oct. 30, 2015

(65) Prior Publication Data

US 2019/0051331 A1   Feb. 14, 2019

(51) Int. Cl.
*G11B 27/034* (2006.01)
*G11B 33/10* (2006.01)

(52) U.S. Cl.
CPC .......... *G11B 27/034* (2013.01); *G11B 33/10* (2013.01)

(58) Field of Classification Search
CPC ....... H04W 4/028; G11B 27/034; G11B 33/10
USPC ...................................................... 386/282
See application file for complete search history.

(56) References Cited

U.S. PATENT DOCUMENTS

| | | | |
|---|---|---|---|
| 2006/0279630 A1* | 12/2006 | Aggarwal | G01S 3/7864 348/143 |
| 2009/0216775 A1* | 8/2009 | Ratliff | G06Q 10/08 |
| 2011/0238476 A1* | 9/2011 | Carr | G06Q 30/00 705/14.25 |

* cited by examiner

*Primary Examiner* — Thai Q Tran
*Assistant Examiner* — Jose M Mesa
(74) *Attorney, Agent, or Firm* — McGeary Cukor LLC; Kenneth Ottesen; Jason Paul DeMont

(57) ABSTRACT

A video editing system that enables replay of activities performed by one or more objects of interest, and displayed on a map. The editing system receives a series of geolocation data points for each object of interest. The system also receives a series of time data points representing when each object was at the respective geolocations. The editing system generates positions in relation to a map of a predetermined geographic region, for the objects. Depending on one or more command inputs that it receives, the editing system then processes and displays markers of the positions of the objects, based on one or more of i) the geolocation data points, ii) the time data points, and iii) the generated map positions. As part of the processing, the editing system is able to stream the displayable data such that the markers appear to move around the map.

25 Claims, 13 Drawing Sheets

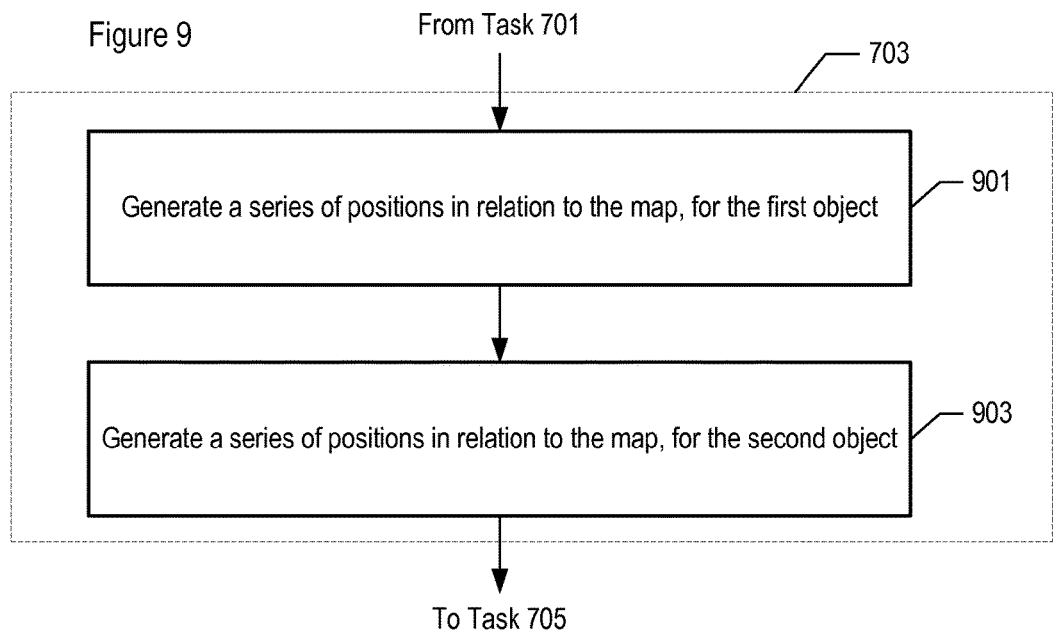
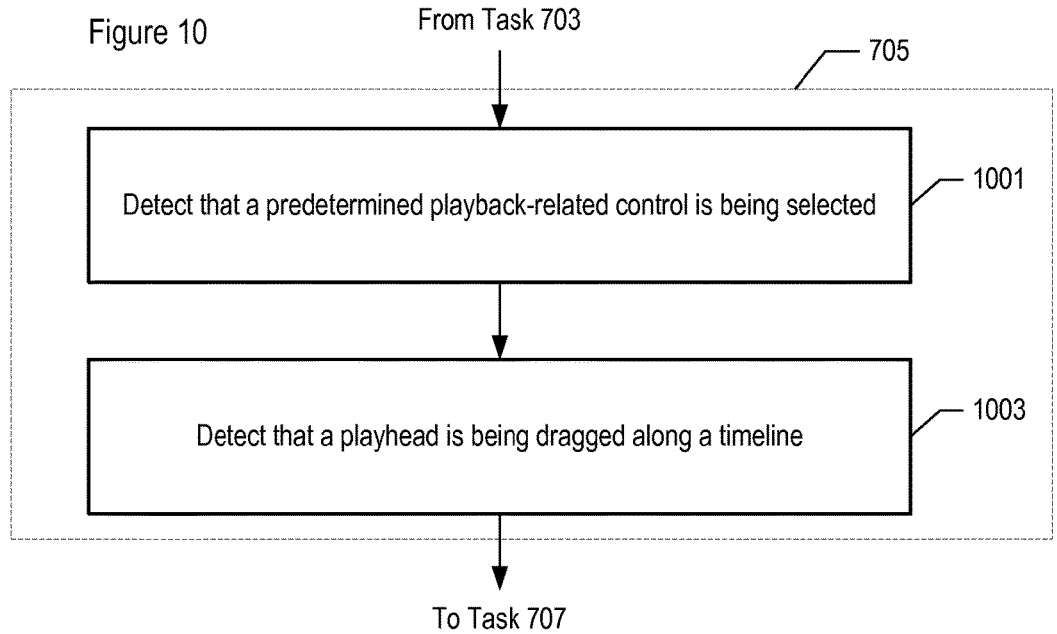

VIDEO EDITING SYSTEM WITH MAP-ORIENTED REPLAY FEATURE

FIELD OF THE INVENTION

The present invention relates to information technology in general, and, more particularly, to video editing equipment.

BACKGROUND OF THE INVENTION

A video editing system is used to manipulate video images. Such a system typically comprises a data-processing system such as a personal computer, a video display, and various user interface devices such as a keyboard and a pointing device. The data-processing system can be a general-purpose computer that comprises a processor, memory, and input and output interfaces that constitute a user interface. The data-processing system executes video editing software that performs editing functions on media content, based on the commands received through the user interface devices, and provides the edited media content to the video display. The video display can be a display apparatus such as a monitor that receives a video signal from the data-processing system and creates a visual image of the signal for the user.

There are various features that a video editing system can typically provide. A first feature is video and audio streaming, in which the video editing system can be used to edit portions of one or more streams of video and audio data, and then play the edited streams via the video display and a loudspeaker. A second feature is timeline presentation, in which a displayed graphic representation of the passage of time as a line can be used to control playback of the streams and to identify where a session that is being played back is in time.

SUMMARY OF THE INVENTION

The present invention enables the usage of video editing controls on a diagrammatic representation, such as a map, and the display of an object of interest's activities on such a representation. For example and without limitation, an object of interest can be a wireless terminal—or, by association, the user of the wireless terminal—and the activity can include the movements of the object, as represented on the display by one or more markers of positions on the displayed map. The positions being displayed can be derived from geolocation data made available by a location engine that is continually determining the geolocations of the object of interest as it moves.

The video editing system of the illustrative embodiment operates in the following manner. The editing system receives a series of geolocation data points for each of one or more objects of interest. The system also receives a series of time data points representing when each object was at the respective geolocations. The editing system generates positions in relation to a map of a predetermined geographic region, for the one or more objects. Depending on one or more command inputs that it receives, the editing system then processes and displays the positions of the objects, based on one or more of i) the geolocation data points, ii) the time data points, and iii) the generated map positions. As part of the processing, the editing system is able to stream the displayable data onto the displayed map, in the form of position markers that appear to move around the map for each object, corresponding to how the geolocation data represents the object moving during a period of time and around the geographic region represented by the map.

In accordance with the illustrative embodiment, the video editing system also features one or more timelines—one per each object of interest, for example—in order to merge and/or edit the video content. Advantageously, the editing system displays the timelines such that each of the individual moments of time along a timeline corresponds to a unique position marker being displayed on the map for an object of interest. In turn, each displayed position marker corresponds to the geolocation at which the object of interest was for a particular moment of time on the object's timeline.

Advantageously, the disclosed video editing system further enables a user to select different time periods that can then be consolidated into a single timeline, or in contiguously-appearing timelines, but in individual streams. The user can replay through all of them, all at once, or focus on a particular point in time.

An illustrative video editing system comprises: a data-processing system configured to a) receive data that are representative of i) a series of plural geolocations of a first object and ii) a series of times representing when the first object was at the respective geolocations, b) generate a first series of positions in relation to a map of a predetermined geographic region, wherein the positions in the first series of positions are based on the respective geolocations in the series of geolocations of the first object, and c) receive a first command; and a display configured to display, based on receiving the first command, i) the map, ii) markers of the first series of positions such that the positions in the first series are superimposed on the map, and iii) a first indication of the time, determined from the series of times, at which the first object was at a particular geolocation that corresponds to a particular position, in the first series of positions, that is being displayed on the map; wherein the positions in the first series are each initially displayed sequentially in time with respect to one another, and wherein the first indication is updated, as part of its displaying, as subsequent positions are displayed on the map.

An illustrative method of video editing comprises: receiving, by a data-processing system, data that are representative of i) a series of plural geolocations of a first object and ii) a series of times representing when the first object was at the respective geolocations; generating, by the data-processing system, a first series of positions in relation to a map of a predetermined geographic region, wherein the positions in the first series of positions are based on the respective geolocations in the series of geolocations of the first object; receiving a first command, by the data-processing system; and displaying on a display, based on the receiving of the first command, i) the map, ii) markers of the first series of positions such that the positions in the first series are superimposed on the map, and iii) a first indication of the time, determined from the series of times, at which the first object was at a particular geolocation that corresponds to a particular position, in the first series of positions, that is being displayed on the map; wherein the positions in the first series are each initially displayed sequentially in time with respect to one another, and wherein the first indication is updated, as part of its displaying, as subsequent positions are displayed on the map.

Another illustrative video editing system comprises: a data-processing system configured to a) receive data that are representative of i) a series of plural geolocations of a first object and ii) a series of times representing when the first object was at the respective geolocations, and b) generate a first series of positions in relation to a map of a predetermined geographic region, wherein the positions in the first series of positions are based on the respective geolocations in the series of geolocations of the first object; and a display configured to display i) the map, ii) markers of the first series of positions such that the positions in the first series are superimposed on the map, iii) a first timeline that represents a duration of activity of the first object, wherein the first series of positions represents the activity of the first object, and iv) a first indication of the time, determined from the series of times, at which the first object was at a particular geolocation that corresponds to a particular position, in the first series of positions, that is being displayed on the map.

Another illustrative method of video editing comprises: receiving, by a data-processing system, data that are representative of i) a series of plural geolocations of a first object and ii) a series of times representing when the first object was at the respective geolocations; generating, by the data-processing system, a first series of positions in relation to a map of a predetermined geographic region, wherein the positions in the first series of positions are based on the respective geolocations in the series of geolocations of the first object; and displaying, on a display, i) the map, ii) markers of the first series of positions such that the positions in the first series are superimposed on the map, iii) a first timeline that represents a duration of activity of the first object, wherein the first series of positions represents the activity of the first object, and iv) a first indication of the time, determined from the series of times, at which the first object was at a particular geolocation that corresponds to a particular position, in the first series of positions, that is being displayed on the map.

BRIEF DESCRIPTION OF THE DRAWINGS

FIG. 9 depicts a flowchart of the salient processes of task 703.

FIG. 10 depicts a flowchart of the salient processes of task 705.

DETAILED DESCRIPTION

Video editing—For the purposes of this specification, the term "video editing" and its inflected forms is defined as the process of manipulating video images.

Map—For the purposes of this specification, the term "map" and its inflected forms is defined as a diagrammatic representation of an area of land and/or water showing one or more of physical features, cities, buildings, and roads.

Object—For the purposes of this specification, the term "object" and its inflected forms is defined as anything that is visible or tangible and is relatively stable in form, such as a thing, person, or matter to which thought or action is directed.

Geolocation—For the purposes of this specification, the term "geolocation" and its inflected forms is defined as the assessed geographic location of an object. A geolocation can be in the form of a street address or geographic coordinates, for example and without limitation.

Marker—For the purposes of this specification, the term "marker" and its inflected forms is defined as an object used to indicate a position, place, or route.

Activity—For the purposes of this specification, the term "activity" and its inflected forms is defined as a thing that an object does. For example and without limitation, the movement of an object through a geographic area can be an activity performed by that object.

Timeline—For the purposes of this specification, the term "timeline" and its inflected forms is defined as a graphic representation of the passage of time as a line. A timeline of an object has i) a first end that corresponds to the time at which an activity of the object initially appears on a display and ii) a second end.

Playhead—For the purposes of this specification, the term "playhead" and its inflected forms is defined as a line that indicates the current position in a time-based window of a video-editing display.

Figure 1:
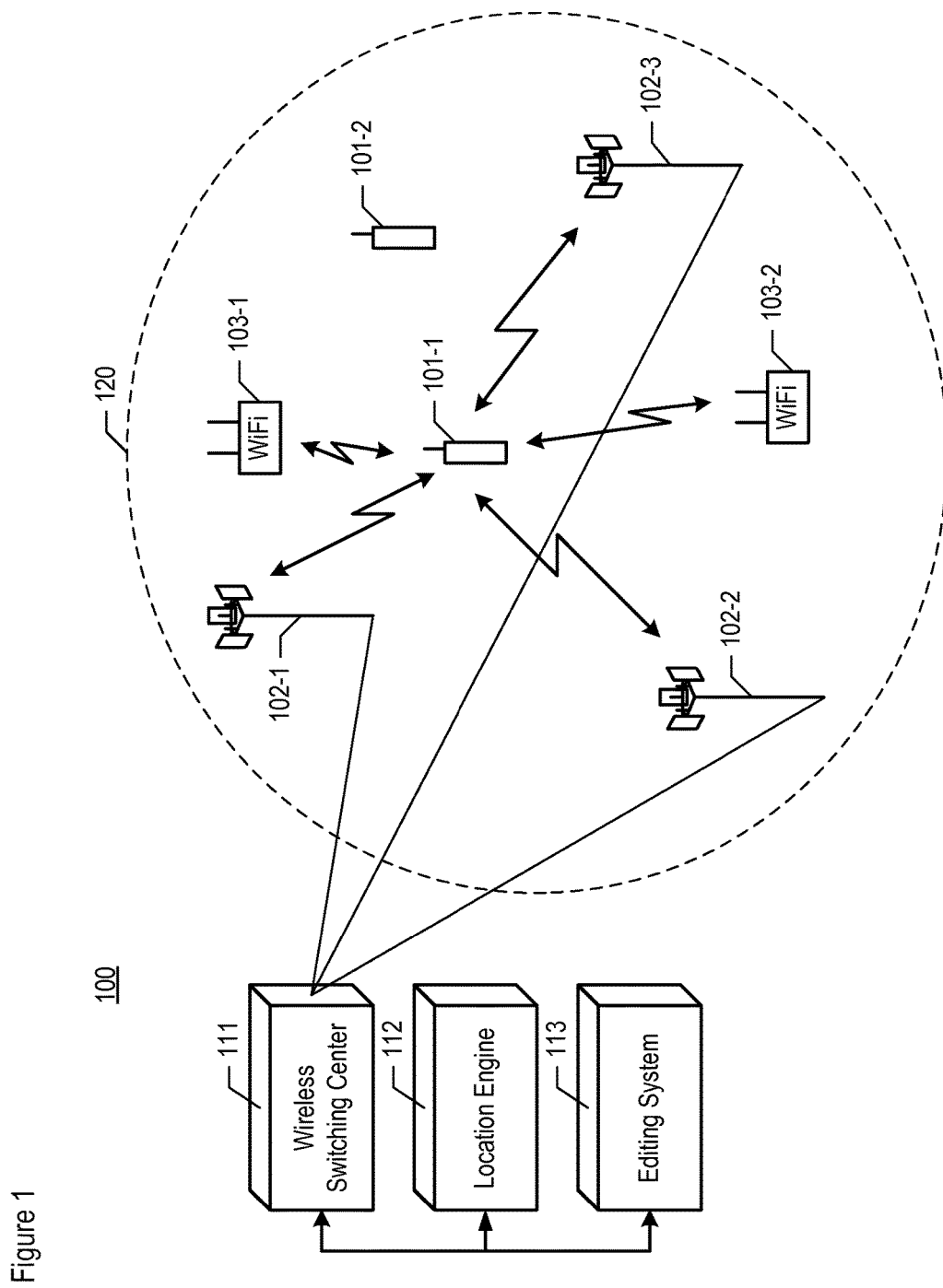
FIG. 1 depicts a diagram of the salient components of wireless telecommunications system 100 in accordance with the illustrative embodiment of the present invention.

FIG. 1 depicts a diagram of the salient components of wireless telecommunications system 100 in accordance with the illustrative embodiment of the present invention. Wireless telecommunications system 100 comprises: wireless terminals 101-1 through 101-J, wherein J is equal to 2 as depicted, cellular base stations 102-1 through 102-K, wherein K is equal to 3 as depicted, Wi-Fi base stations 103-1 through 103-L, wherein L is equal to 2 as depicted, wireless switching center 111, location engine 112, and editing system 113, which are interrelated as shown. The illustrative embodiment provides wireless telecommunications service to all of geographic region 120, in well-known fashion, estimates the locations of wireless terminals 101-1 through 101-J within geographic region 120 at different times, and uses those estimates in an editing application.

In accordance with the illustrative embodiment, wireless telecommunications service is provided to wireless terminals 101-$j$, wherein $j$ can have a value of between 1 and J, in accordance with the air-interface standard of the 3$^{rd}$ Generation Partnership Project ("3GPP"). After reading this disclosure, however, it will be clear to those skilled in the art how to make and use alternative embodiments of the present invention that operate in accordance with one or more other air-interface standards (e.g., Global System Mobile "GSM," UMTS, CDMA-2000, IS-136 TDMA, IS-95 CDMA, 3G Wideband CDMA, IEEE 802.11 Wi-Fi, 802.16 WiMax, Bluetooth, etc.) in one or more frequency bands. As will be clear to those skilled in the art, a wireless terminal is also known as a "cell phone," "mobile station," "smartphone," "car phone," "PDA," and the like.

Wireless terminal 101-j comprises the hardware and software necessary to be 3GPP-compliant and to perform the processes described below and in the accompanying figures. For example and without limitation, wireless terminal 101-j is capable of:

i. measuring one or more location-dependent traits of each of one of more electromagnetic signals (transmitted by cellular base stations 102-1 through 102-K and Wi-Fi base stations 103-1 through 103-L) and of reporting the measurements to location engine 112, and ii. transmitting one or more signals and of reporting the transmission parameters of those signals to location engine 112.

Wireless terminal 101-j is mobile and can be at any location within geographic region 120 at any time. Although wireless telecommunications system 100 comprises two wireless terminals, it will be clear to those skilled in the art, after reading this disclosure, how to make and use alternative embodiments of the present invention that comprise any number of wireless terminals.

Cellular base stations 102-1 through 102-K communicate with wireless switching center 111 via wireline and with each wireless terminal 101-j via radio in well-known fashion. As is well known to those skilled in the art, base stations are also commonly referred to by a variety of alternative names such as access points, nodes, network interfaces, etc. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment of the present invention, cellular base stations 102-1 through 102-K are terrestrial, immobile, and within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 102-1 through 102-K comprise the hardware and software necessary to be 3GPP-compliant and to perform the processes described below and in the accompanying figures. For example and without limitation, cellular base stations 102-1 through 102-K are capable of:

i. measuring one or more location-dependent traits of each of one of more electromagnetic signals (transmitted by wireless terminal 101-j) and of reporting the measurements to location engine 112, and ii. transmitting one or more signals and of reporting the transmission parameters of those signals to location engine 112.

Wi-Fi base stations 103-1 through 103-L communicate with wireless terminal 101-j via radio in well-known fashion. Wi-Fi base stations 103-1 through 103-L have a shorter range than cellular base stations 102-1 through 102-J, but have a higher bandwidth. Wi-Fi base stations 103-1 through 103-L are terrestrial, immobile, and within geographic region 120.

Wi-Fi base stations 103-1 through 103-L are capable of:

i. measuring one or more location-dependent traits of each of one of more electromagnetic signals (transmitted by wireless terminal 101-j) and of reporting the measurements to location engine 112, and ii. transmitting one or more signals and of reporting the transmission parameters of those signals to location engine 112.

Although the illustrative embodiment comprises two WiFi base stations, it will be clear to those skilled in the art, after reading this disclosure, how to make and use alternative embodiments of the present invention that comprise any number of WiFi base stations.

Wireless switching center 111 comprises a switch that orchestrates the provisioning of telecommunications service to wireless terminal 101-j and the flow of information to and from location engine 112, as described below and in the accompanying figures. As is well known to those skilled in the art, wireless switching centers are also commonly referred to by other names such as mobile switching centers, mobile telephone switching offices, routers, etc.

Although the illustrative embodiment comprises one wireless switching center, it will be clear to those skilled in the art, after reading this disclosure, how to make and use alternative embodiments of the present invention that comprise any number of wireless switching centers. For example, when a wireless terminal can interact with two or more wireless switching centers, the wireless switching centers can exchange and share information that is useful in estimating the location of the wireless terminal.

In accordance with the illustrative embodiment, all of the base stations servicing wireless terminal 101-j are associated with wireless switching center 111. It will be clear to those skilled in the art, after reading this disclosure, how to make and use alternative embodiments of the present invention in which any number of base stations are associated with any number of wireless switching centers.

Location engine 112 comprises hardware and software that generates one or more estimates of the location of wireless terminal 101-j for a given moment in time, and can do so for multiple times and for multiple wireless terminals. There are many techniques in the prior art that can be used by location engine 112 for estimating the location of a wireless terminal. In accordance with some techniques, the location of a wireless terminal is estimated, at least in part, from measurements that are reported by the wireless terminal. The reported measurements are of signals measured by the wireless terminal that are transmitted by one or more base stations through their antennas and, in some cases, by Global Positioning System (GPS) satellites. Some techniques rely on signal-strength measurements, while some other techniques rely on time-based measurements, while still some other techniques rely on other types of measurements. In any event, it will be clear to those skilled in the art how to make and use location engine 112.

Although location engine 112 as depicted in FIG. 1 as physically distinct from wireless switching center 111, it will be clear to those skilled in the art, after reading this disclosure, how to make and use alternative embodiments of the present invention in which location engine 112 is wholly or partially integrated with wireless switching center 111.

Editing system 113 comprises hardware and software that uses the estimates for the locations over a period of time of wireless terminal 101-j—provided by location engine 112—in a location-based application, as described below and in the accompanying figures.

In accordance with the illustrative embodiment, editing system 113 communicates with location engine 112 via a local area network; however it will be clear to those skilled in the art, after reading this disclosure, how to make and use alternative embodiments of the present invention in which editing system 113 communicates with one or more of the entities depicted in FIG. 1 via a different network such as, for example, the Internet, the Public Switched Telephone Network (PSTN), a wide area network, etc.

In accordance with the illustrative embodiment, wireless switching center 111, location engine 112, and editing system 113 are physically located within geographic region 120. It will be clear to those skilled in the art, however, after reading this disclosure, how to make and use alternative embodiments of the present invention in which some or all of wireless switching center 111, location engine 112, and editing system 113 are physically located outside of geographic region 120.

Figure 2:
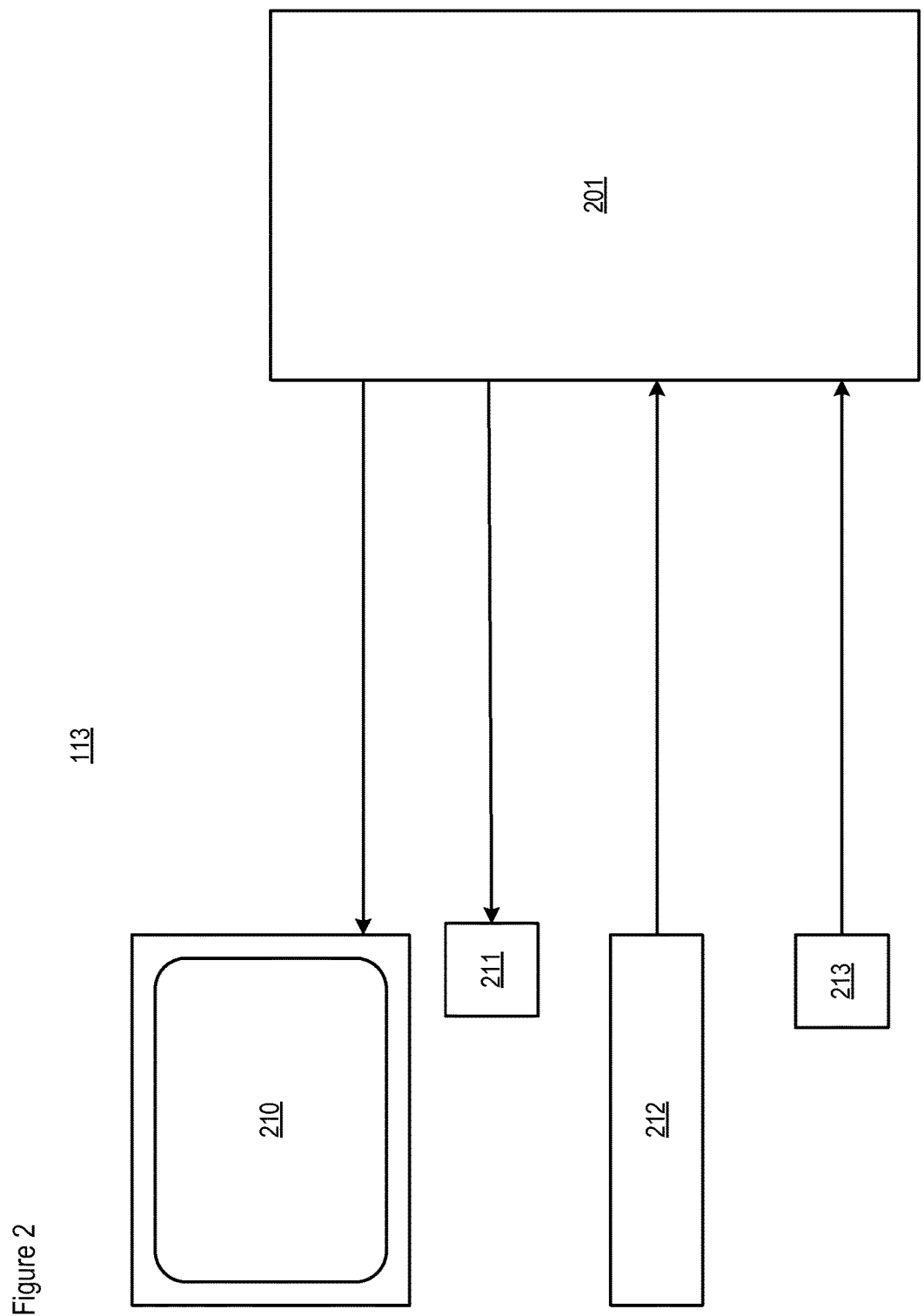
FIG. 2 depicts a block diagram of the salient components of editing system 113 of telecommunications system 100.

FIG. 2 depicts a block diagram of the salient components of editing system 113 in accordance with the illustrative embodiment of the present invention. Editing system 113 comprises: data-processing system 201, video display 210, speaker 211, keyboard 212, and pointing device 213, interconnected as shown.

Data-processing system 201 is a general-purpose computer that comprises a processor, memory, and input and output interfaces for a user interface. Data-processing system 201 is capable of performing the tasks described below and with respect to FIGS. 7 through 11. In particular, data-processing system 201:
  i. outputs a video signal to video display 210, in well-known fashion, and
  ii. receives a keyboard signal from keyboard 212, in well-known fashion, and
  iii. receives a pointing and command signal from pointing device 213, in well-known fashion, and
  iv. outputs a speaker signal to speaker 211, in well-known fashion.

Data-processing system 201 provides a graphical user interface, in well-known fashion, and is capable of accepting user-level commands via:
  i. keyboard 212, or
  ii. pointing device 213, or
  iii. the combination of i and ii.

Video display 210 is a display (e.g., a monitor, etc.) as is well known in the art that receives a video signal and creates a visual image of the signal for a user. It will be clear to those skilled in the art how to make and use video display 210.

Speaker 211 is an electro-acoustic transducer as is well known in the art that receives a speaker signal and creates an audible sound of the signal for a user. It will be clear to those skilled in the art how to make and use speaker 211.

Keyboard 212 is a character input device as is well-known in the art that receives input from a user and transmits keyboard signals representing that input. It will be clear to those skilled in the art how to make and use keyboard 212.

Pointing device 213 is a spatial input device (e.g., a mouse, a joystick, a touchpad, a stylus, etc.) as is well known in the art that receives spatial and command (e.g., button, wheel, etc.) input from a user and that transmits pointing and command signals representing that input. It will be clear to those skilled in the art how to make and use pointing device 213.

Figure 3:
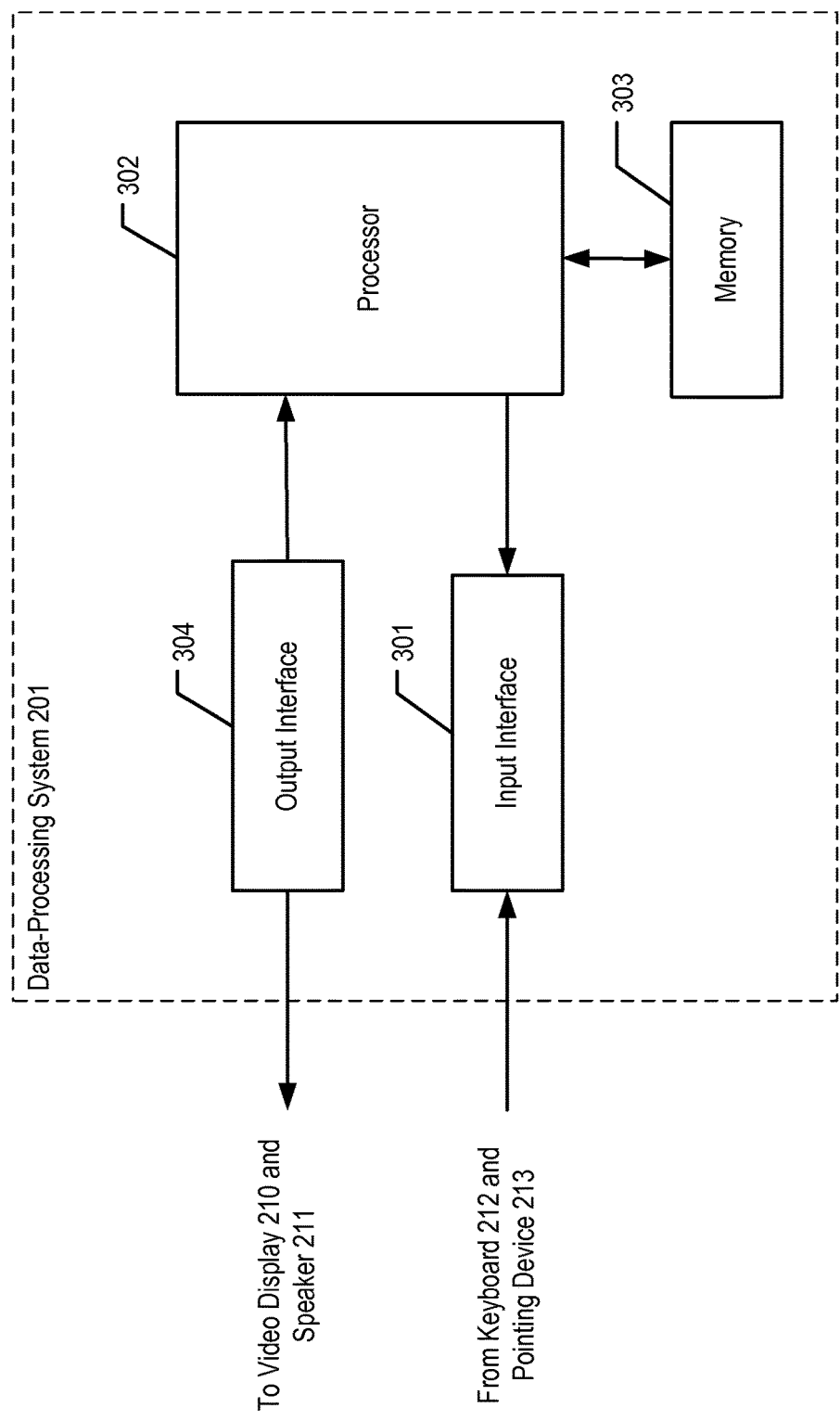
FIG. 3 depicts a block diagram of the salient components of data-processing system 201 of edited system 113.

FIG. 3 depicts a block diagram of the salient components of data-processing system 201, in accordance with the illustrative embodiments of the present invention. Data-processing system 201 comprises input interface 301, processor 302, memory 303, and output interface 304, interconnected as shown. In some embodiments, data-processing system 201 is a personal computer.

Input interface 301 receives signals from keyboard 212 and pointing device 213, and forwards the information encoded in the signals to processor 302, in well-known fashion. It will be clear to those skilled in the art how to make and use input interface 301.

Processor 302 is a general-purpose processor that is capable of: receiving information from input interface 301; reading data from and writing data into memory 303; executing the tasks described below and with respect to FIGS. 7 through 11; and transmitting information to output interface 304. In some alternative embodiments of the present invention, processor 302 might be a special-purpose processor. In either case, it will be clear to those skilled in the art, after reading this specification, how to make and use processor 302.

Memory 303 stores data and executable instructions, in well-known fashion, is a combination of volatile and non-volatile memory, and is non-transitory. It will be clear to those skilled in the art, after reading this specification, how to make and use memory 303.

Output interface 304 receives information from processor 302, and outputs signals that encode this information to video display 210 and speaker 211, in well-known fashion. In some embodiments, output interface 304 can be built into a video card, which can be used to offload at least some of the processing from processor 302. It will be clear to those skilled in the art, after reading this specification, how to make and use output interface 304.

Figure 4:
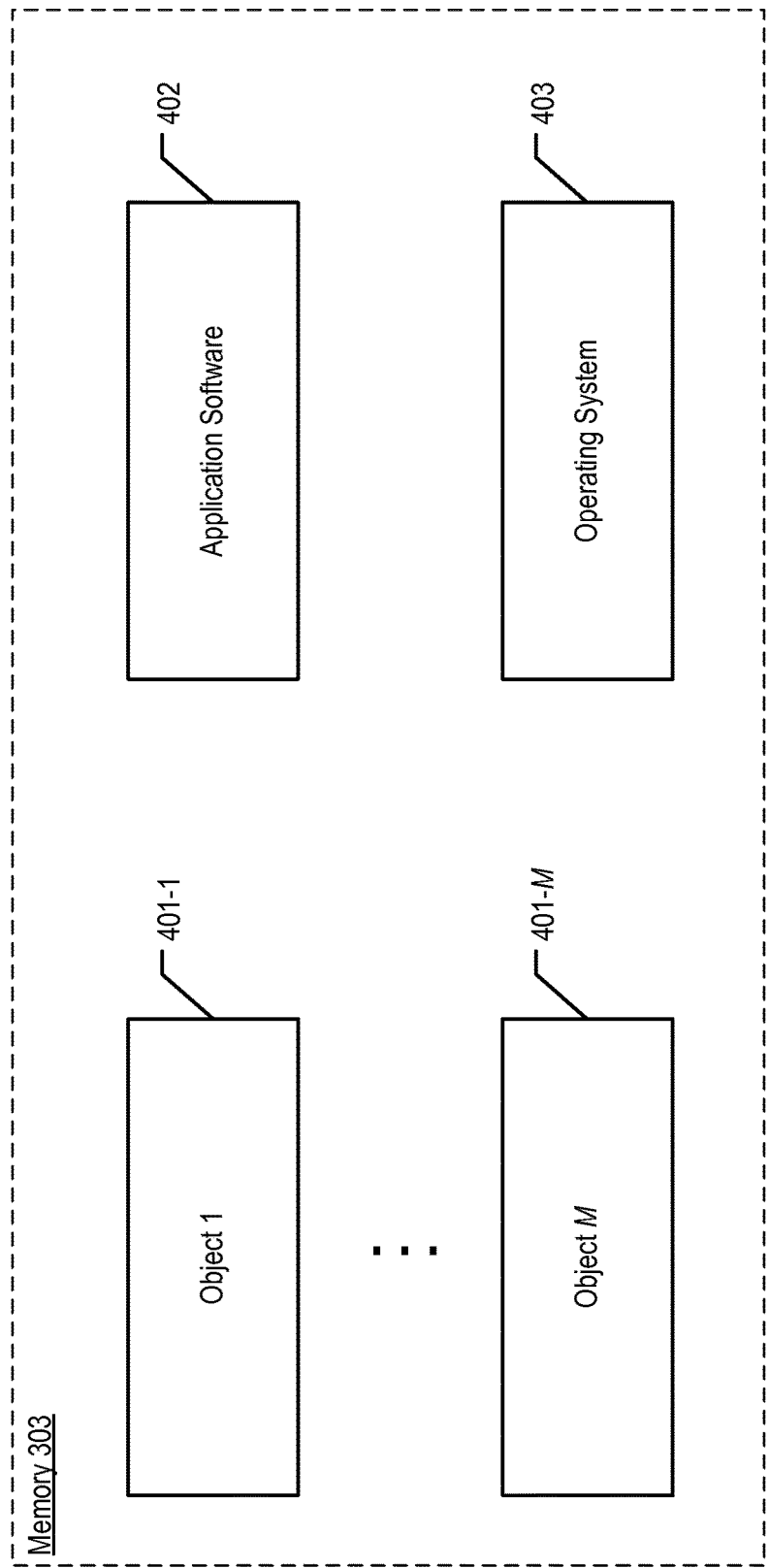
FIG. 4 depicts a map of the salient contents of memory 303 of data-processing system 201.

FIG. 4 depicts a map of the salient contents of memory 303, which comprises the files relating to M objects of interest, namely object files 401-1 through 401-M that represent objects 1 through M, respectively, application software 402, and operating system 403. In accordance with the illustrative embodiment of the present invention, objects 1 and 2 correspond to wireless terminals 101-1 and 101-2, respectively. As those who are skilled in the art will appreciate after reading this specification, however, objects 1 through M can correspond to any type of object that can be tracked (e.g., people, vehicles, equipment, goods, etc.) and in any combination of types of objects.

The object files associated with each object of interest comprise i) data that are representative of one or more series of geolocations of the object, ii) data that are representative of one or more series of times representing when the object was at the respective geolocations, wherein both types of data can be received from location engine 112 and stored.

Application software 402 is the software portion of the editing system, the executable tasks of which are described below and with respect to FIGS. 7 through 11. Operating system 403 is an operating system that performs input/output, file and memory management, and all of the other functions normally associated with operating systems, in well-known fashion. It will be clear to those skilled in the art how to make and use operating system 403.

Figure 5:
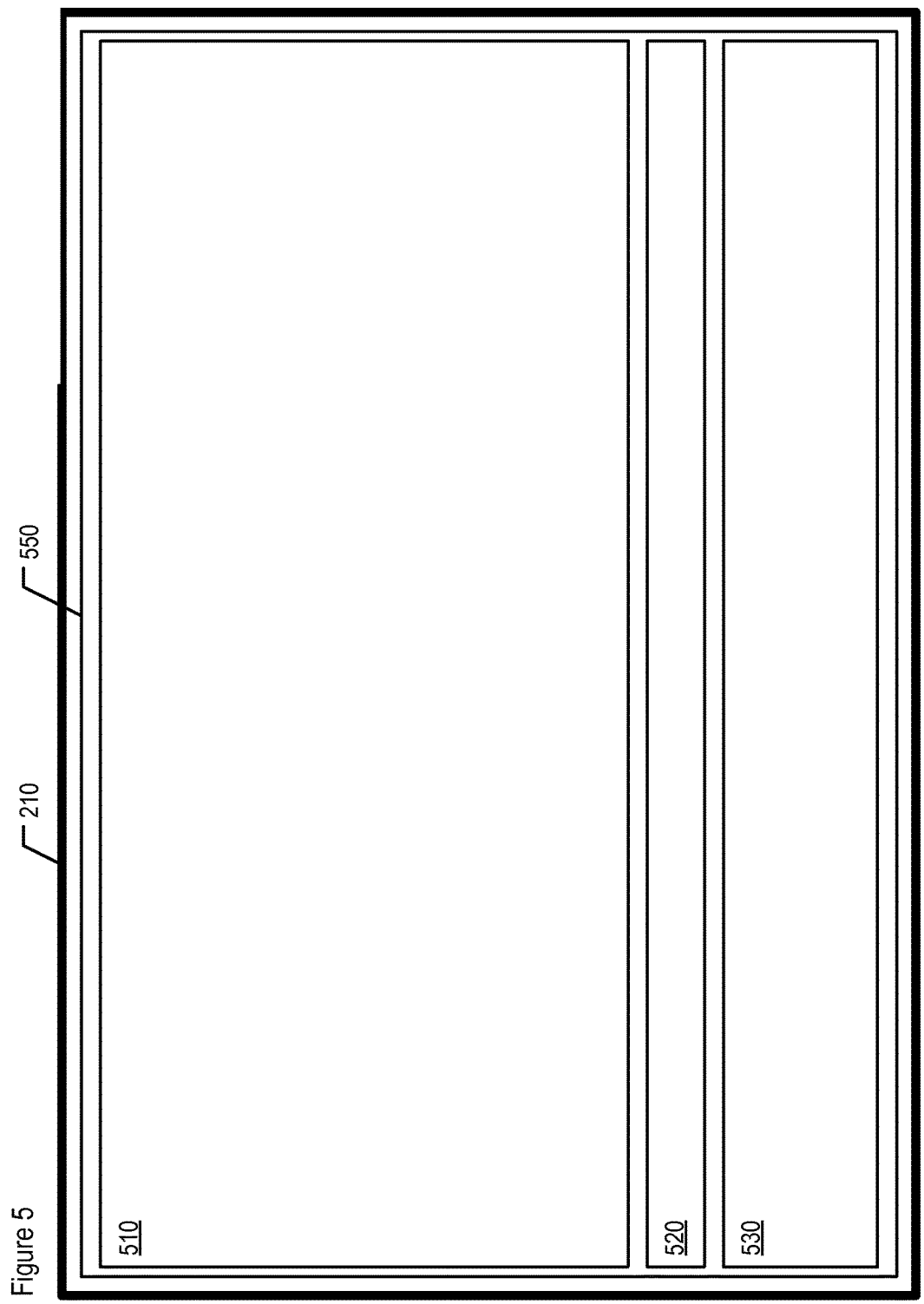
FIG. 5 depicts image 550 displayed on video display 210 of editing system 113.

FIG. 5 depicts an image on video display 210 in accordance with the illustrative embodiment of the present invention. Image 550 comprises: map pane 510, playback command pane 520, and timeline pane 530. Map pane 510 is a graphical display space that displays text and other graphical objects that constitute one or more maps. In accordance with the illustrative embodiment, one or more maps are featured (e.g., displayed, etc.). As those who are skilled in the art will appreciate after reading this specification, however, a type of diagram or diagrammatic representation different than a map can be processed and displayed. Playback command pane 520 is a graphical display space that displays one or more playback command controls. Timeline pane 530 is a graphical display space that displays one or more timelines. The panes are further described below and with respect to FIG. 6.

The panes as depicted in FIG. 5 are in a particular arrangement. As those who are skilled in the art will appreciate after reading this specification, however, the panes can be situated in a different arrangement than depicted (e.g., different shapes, different relative positions, different direction of alignment, etc.).

Figure 6:
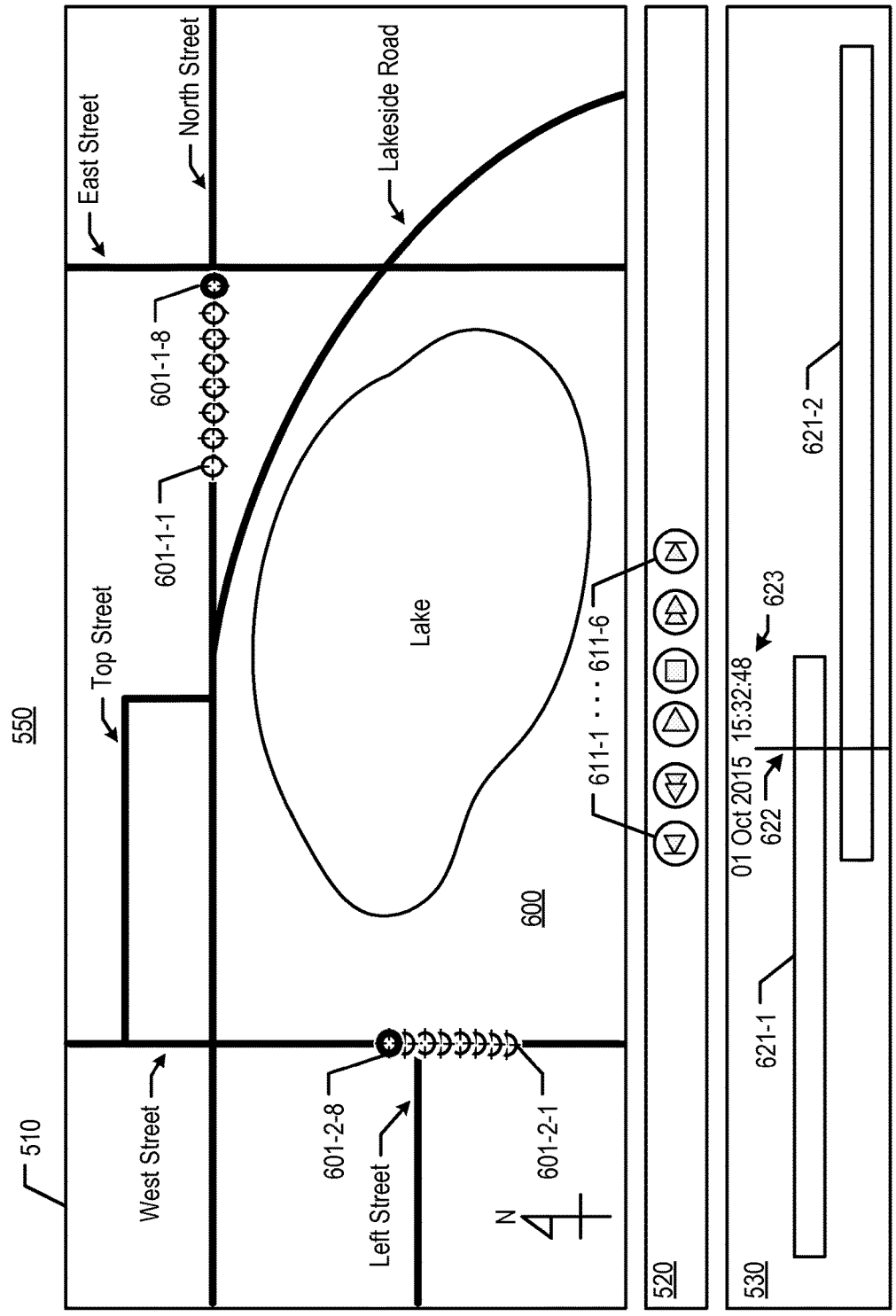
FIG. 6 depicts examples of map pane 510, playback command pane 520, and timeline pane 530, as part of displayed image 550.

FIG. 6 depicts examples of map pane 510, playback command pane 520, and timeline pane 530, as part of displayed image 550.

Map pane 510 is depicted as containing map 600 of a predetermined geographic region, the map being a representation of an area comprising land and/or water. Illustratively, map 600 is a diagrammatic representation of at least a portion of geographic region 120. Map 600 in particular shows roads and a lake, with labels that identify each of said features. As those who are skilled in the art will appreciate after reading this specification, map pane 510 is capable of containing a map showing a different set of features than those depicted, including other physical features, other types of roads, other bodies of water, cities, buildings, and so on, as well as other types of labeling.

Pane 510 also contains markers 601-1-1 through 601-1-N that correspond to a series of N positions in relation to map 600, the N positions corresponding to a first series of N geolocations of where wireless terminal 101-1 is estimated by location engine 112 to have been. As depicted, N is equal to 8, although in some embodiments of the present invention N can have a different value than depicted (e.g., 50, etc.). Similarly, pane 510 contains markers 601-2-1 through 601-2-N that correspond to a second series of N positions in relation to map 600, the N positions corresponding to a series of N geolocations of where wireless terminal 101-2 is estimated by location engine 112 to have been. Although as depicted the number of markers associated with wireless terminal 101-1 and the number of markers associated with wireless terminal 101-2 are equal to each other, in some alternative embodiments of the present invention the number of markers can vary across different wireless terminals and/or under different circumstances.

Each series of markers represent a predetermined activity of the particular wireless terminal being displayed, such as movement within the displayed geographic area. In each series of markers as depicted, in a session that is being played back, the highest-indexed marker (e.g., marker 601-1-N, marker 601-2-N) corresponds to the newest currently-displayed position. Meanwhile, the lowest-indexed marker (e.g., marker 601-1-1, marker 601-2-1) corresponds to the oldest currently-displayed position. Each equally-indexed marker across multiple wireless terminals (i.e., markers 601-1-$n$ and 601-2-$n$) corresponds to the same moment in absolute time. For example, markers 601-1-8 and 601-2-8 represent the newest currently-displayed positions for terminals 101-1 and 101-2, respectively, and for the same absolute time being displayed. With regard to marker spacing, the position markers for wireless terminal 101-1 are spaced farther part than the position markers for wireless terminal 101-2, thereby suggesting that terminal 101-1 is moving faster than terminal 101-2, at least when they were at the geolocations currently being played back and displayed.

Playback command pane 520 is depicted as containing playback command controls 611-1 through 611-P. As depicted, P is equal to 6, although in some embodiments of the present invention P can have a different value than depicted. Playback controls 611-1 through 611-6 correspond to control functions "skip back", "rewind", "play", "pause", "fast-forward", and "skip ahead", respectively. As those who are skilled in the art will appreciate after reading this specification, a different set of playback control functions can be present.

Timeline pane 530 is depicted as containing timeline 621-1 corresponding to the duration of time during which wireless terminal 101-1 is present in the area defined by map 600 or, more generally, during which the terminal is engaged in a predetermined activity (e.g., movement throughout a displayed area, etc.). Timeline pane 530 also contains timeline 621-2 corresponding to the duration of time during which wireless terminal 101-2 is present in the area defined by map 600 or, more generally, during which the terminal is engaged in a predetermined activity. Also present are playhead 622 and alphanumeric time 623, both of which are indications that correspond to the time at which terminals 101-1 and 101-2 were at the positions represented by their leading position markers. As those who are skilled in the art will appreciate after reading this specification, in some embodiments a different combination of elements can be present within timeline pane 530 such as a different number of timelines for a different number of wireless terminals, an alphanumeric time without the date, a different formatting of the time and/or date, a different style of playhead, and so on, for example and without limitation.

Figure 7:
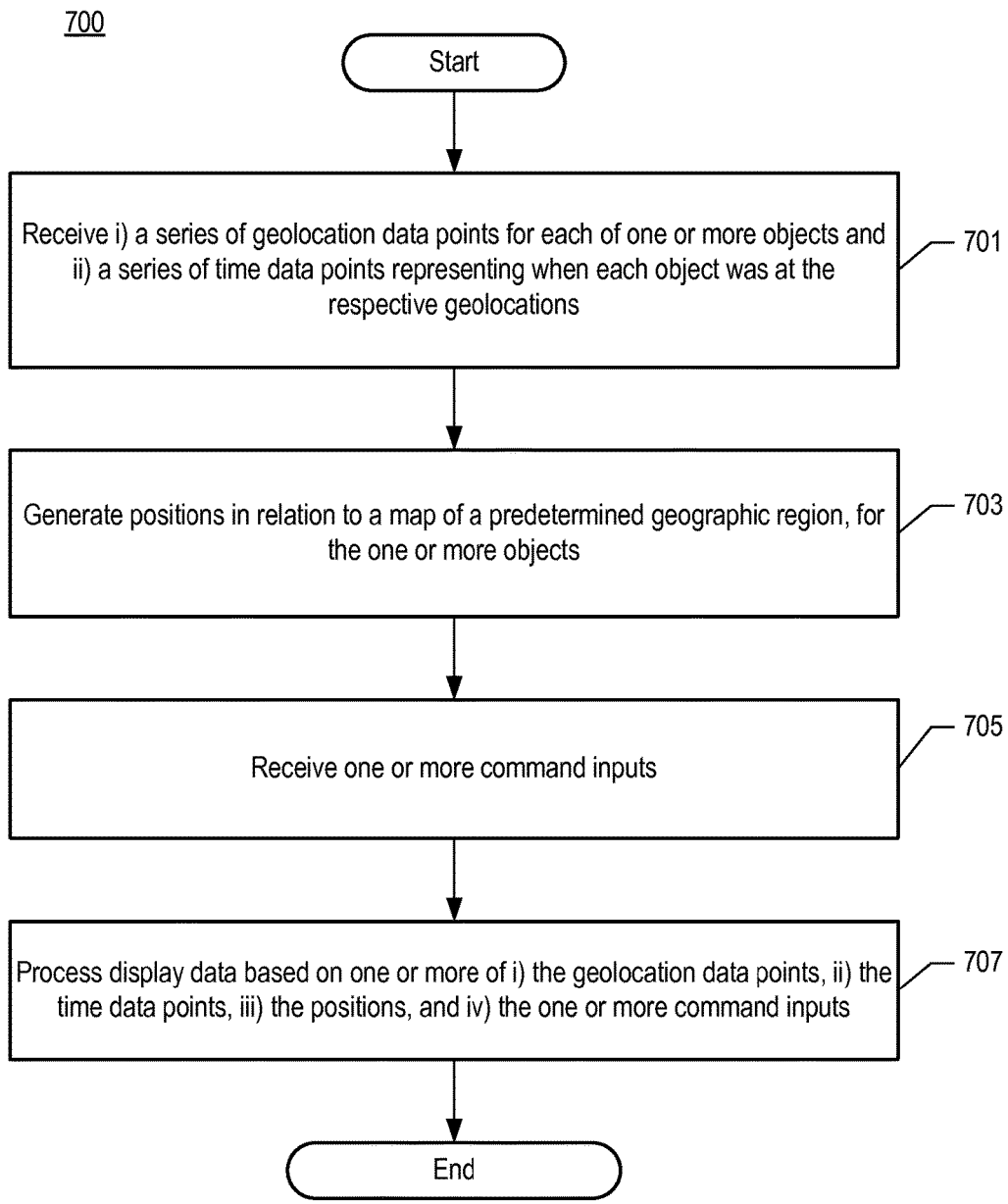
FIG. 7 depicts a flowchart of the salient processes of method 700, performed in accordance with the illustrative embodiment of the present invention.

FIG. 7 depicts a flowchart of the salient processes of method 700, performed in accordance with the illustrative embodiment of the present invention. It will be clear to those having ordinary skill in the art, after reading the present disclosure, how to make and use alternative embodiments of the disclosed methods wherein the recited operations sub-operations, and messages are differently sequenced, grouped, or sub-divided—all within the scope of the present disclosure. It will be further clear to those skilled in the art, after reading the present disclosure, how to make and use alternative embodiments of the disclosed methods wherein some of the described operations, sub-operations, and messages are optional, are omitted, or are performed by other elements and/or systems.

At task 701, data-processing system 201 receives data points that are representative of a series of geolocations for each of one or more objections. System 201 also receives data points that are representative of a series of times representing when each object was at the respective geolocations. Task 701 is described in detail below and with respect to FIG. 8.

At task 703, data-processing system 201 generates positions in relation to a map of a predetermined geographic region, for the one or more objects. Task 703 is described in detail below and with respect to FIG. 9.

At task 705, data-processing system 201 receives one or more command inputs (e.g., via keyboard 212, via pointing device 213, etc.). Task 705 is described in detail below and with respect to FIG. 10.

At task 707, data-processing system 201 processes display data based on one or more of i) the geolocation data received in accordance with task 701, ii) the time data received in accordance with task 701, iii) the positions generated in accordance with task 703, and iv) the one or more command inputs received in accordance task 705. Task 707 is described in detail below and with respect to FIG. 11.

Figure 8:
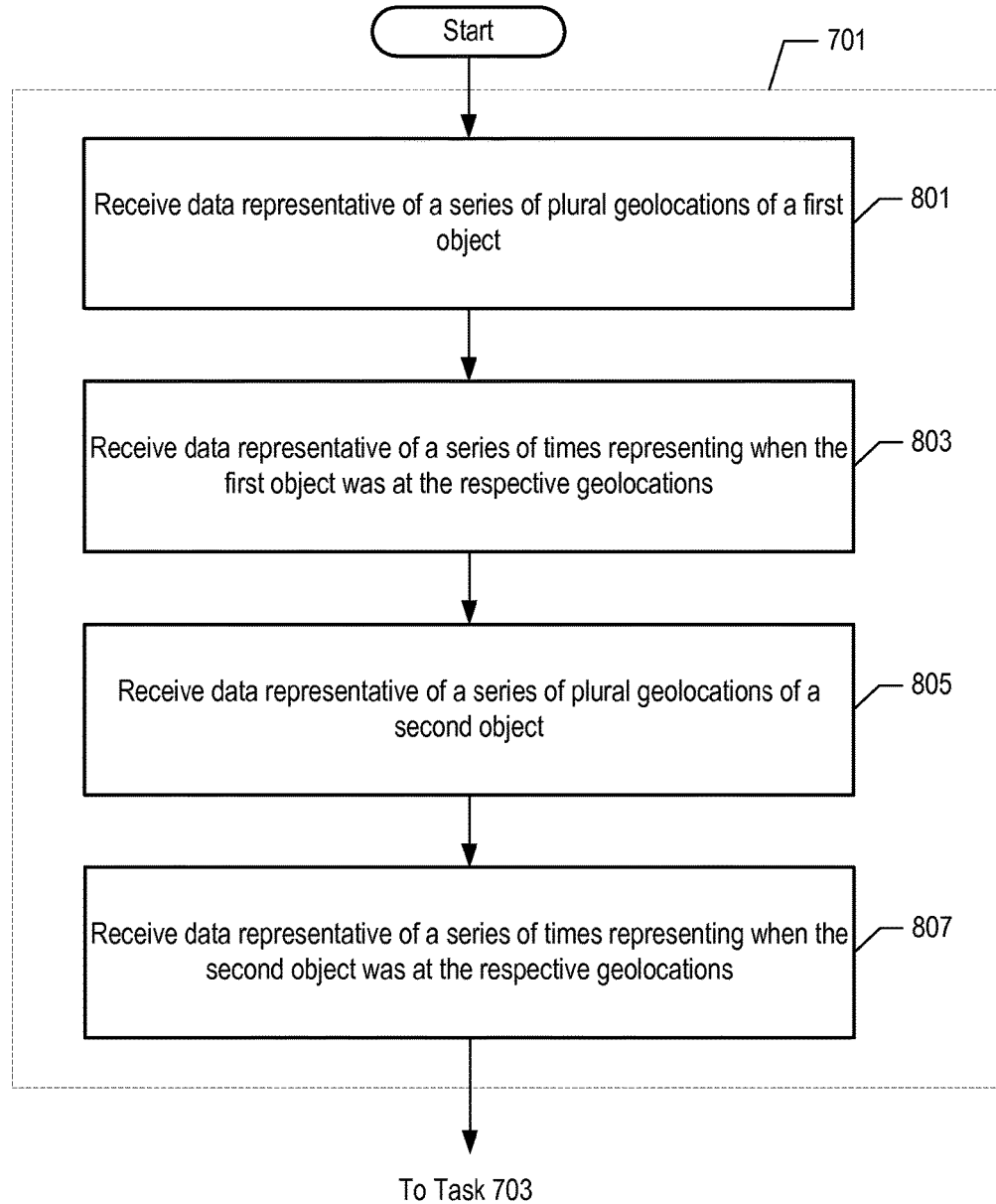
FIG. 8 depicts a flowchart of the salient processes of task 701.

FIG. 8 depicts a flowchart of the salient processes of task 701. At task 801, data-processing system 201 receives, from location engine 112, data that are representative of a series of plural geolocations of wireless terminal 101-1 (i.e., a first object).

At task 803, data-processing system 201 receives, from location engine 112, data that are representative of a series of times representing when wireless terminal 101-1 was at the respective geolocations received in accordance with task 801.

At task 805, data-processing system 201 receives, from location engine 112, data that are representative of a series of plural geolocations of wireless terminal 101-2 (i.e., a second object).

At task 807, data-processing system 201 receives, from location engine 112, data that are representative of a series of times representing when wireless terminal 101-2 was at the respective geolocations received in accordance with task 805.

Control of task execution then proceeds to task 703.

FIG. 9 depicts a flowchart of the salient processes of task 703. At task 901, data-processing system 201 generates a first series of positions in relation to map 600 of a predetermined geographic region, including positions 601-1-1 through 601-1-8. The positions in the first series of positions are based on the respective geolocations in the series of geolocations of wireless terminal 101-1 received at task 801.

At task 903, data-processing system 201 generates a second series of positions in relation to map 600, including positions 601-2-1 through 601-2-8. The positions in the second series of positions are based on the respective geolocations in the series of geolocations of wireless terminal 101-2 received at task 805.

As those who are skilled in the art will appreciate after reading this specification, the generating of the series of positions whose markers are to be displayed can be performed in a variety of ways. For example, the generating can occur based on a playback command having been selected, or the generating can occur independent of a playback command but dependent on the amount of geolocation data received, or can be independent of both. Also, the number of map positions being generated can be based on the number of markers to be displayed at any given time or can be independent of the number of markers.

Control of task execution then proceeds to task 705.

FIG. 10 depicts a flowchart of the salient processes of task 705. At task 1001, data-processing system 201 detects that a predetermined, playback-related control of controls 611-1 through 611-6 is being selected. System 201 then stores an indication of the particular selection in memory 303, the indication being used later in order to determine how to control playback.

At task 1003, data-processing system 201 detects that playhead 622 is being dragged along timeline 621-1 or 621-2, or both. System 201 then stores an indication of where the playhead is being dragged to and on which timeline or timelines, the indication being used later in order to determine how to update the display based on the playhead position.

Control of task execution then proceeds to task 707.

Figure 11:
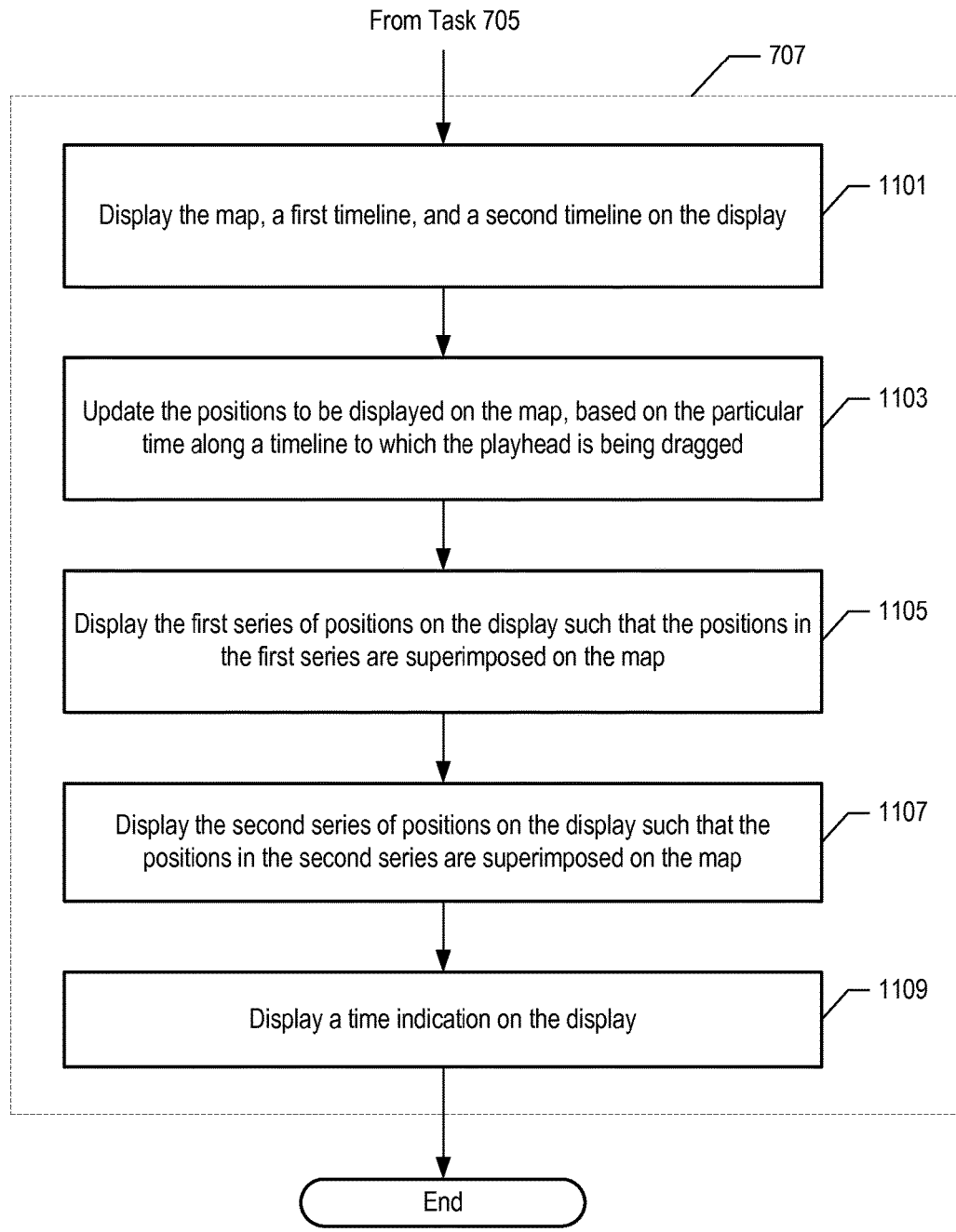
FIG. 11 depicts a flowchart of the salient processes of task 707.

FIG. 11 depicts a flowchart of the salient processes of task 707. In performing these display-related tasks, data-processing system 201 generates displayable information and transmits it to display 210, which then receives the transmitted information and performs the actual presenting of the displayable information to a user of video editing system 113.

At task 1101, data-processing system 201 displays map 600 on display 210. System 201 also displays timeline 621-1 and timeline 621-2 on display 210.

Figure 12:
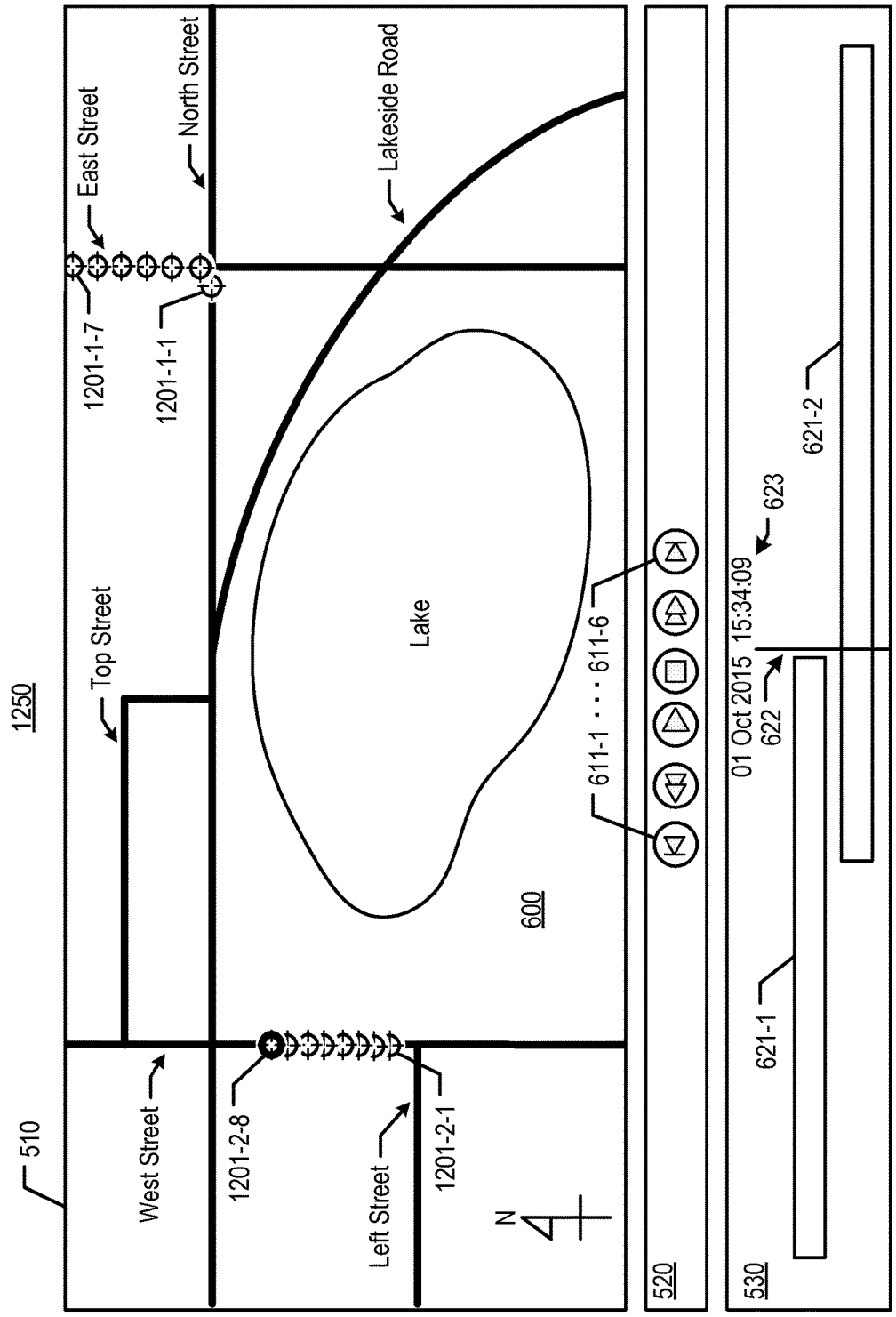
FIG. 12 depicts an example of playhead 622 having been dragged to a new position, as part of image 1250.

At task 1103, data-processing system 201 updates the positions being displayed on map 600, based on the particular time along the first timeline to which the playhead is being dragged, as detected and stored at task 1003. FIG. 12 depicts an example of playhead 622 having been dragged to a new position with respect to timelines 621-1 and 621-2, as reflected in displayed image 1250. In particular, playhead 622 has been dragged to a new position within timeline pane 530, the new position being just to the right of the rightmost end of timeline 621-1 and farther along timeline 621-2. Alphanumeric time 623 has been updated accordingly to a later time along the timelines.

Correspondingly, the position markers for wireless terminal 101-1 and position markers for wireless terminal 101-2 are also updated. They are generated, if they are not already available from tasks 901 and 903, and then based on the later geolocation data corresponding to the later time to which the playhead has been dragged, the positions are displayed in FIG. 12 as markers 1201-1-1 through 1201-1-7 and markers 1201-2-1 through 1201-2-8, respectively. In the example, the position markers show how wireless terminals 101-1 and 101-2 have progressed in their movements. The position of wireless terminal 101-1 as of the currently-displayed time, "15:34:09", is actually just out of the geographic region represented by map 600, which is consistent with playhead 622 being positioned just off of timeline 621-1.

At task 1105 in FIG. 11, data-processing system 201 displays, on display 210, position markers of the series of positions for wireless terminal 101-1, such that the positions in the series are superimposed on map 600. As of time 15:34:09, position markers 1201-1-1 through 1201-1-7 are displayed, as seen in FIG. 12, and as of time 15:32:48, position markers 601-1-1 through 601-1-8 are displayed, as seen in FIG. 6.

At task 1107, data-processing system 201 displays, on display 210, position markers of the series of positions for wireless terminal 101-2, such that the positions in the series are superimposed on map 600. As of time 15:34:09, position markers 1201-2-1 through 1201-2-7 are displayed, as seen in FIG. 12, and as of time 15:32:48, position markers 601-2-1 through 601-2-8 are displayed, as seen in FIG. 6. Any appearance on the map of the positions in the series for terminal 101-1 and any appearance on the map of the positions in the series for terminal 101-2 are independent of each other, and are determined by the geolocation data and time data for each wireless terminal.

At task 1109, data-processing system 201 displays one or more indications of the time, determined from data that are representative of the series of times received at task 803 or task 807, or both, at which the first object was at a particular geolocation that corresponds to a particular position, in one or more series of positions that are being displayed on map 600. Non-limiting examples of the displayed indication of time include playhead 622 and alphanumeric time 623. In some embodiments, the position of the indication of time being displayed is coincident to a position on a timeline that corresponds to a particular position marker (e.g., the leading marker) that is being displayed on map 600.

In regard to tasks 1105 through 1109, if a predetermined playback-related control has been selected, as detected and stored at task 1001, data-processing system 201 takes further action in regard to displaying the position markers of the wireless terminal or terminals and the indication of the time currently being displayed. If a "play" control has been selected, system 201 plays the activities of one or more objects, for example showing movement of each object on the display as time progresses. In doing so, system 201 displays the information such that the positions in each series that is being displayed are each initially displayed sequentially in time with respect to one another. Also, the indication of time that is being displayed is continually updated, as subsequent positions are displayed on map 600.

In other words, data-processing system 201 streams the displayable data onto map 600 displayed by display 210, as the most-recent N position markers. During session playback, these markers appear to move around the map for each object, corresponding to how the geolocation data represents the object moving during a period of time and around the geographic region represented by the map.

In accordance with the illustrative embodiment of the present invention, data-processing system 201 plays through each timeline at a first predetermined rate. For example, system 201 can play at a real-time rate—that is, a rate that is equal to the rate at which each object actually moved or actually conducted its activity. As another example, system 201 can play at a rate other than real time (e.g., half as fast, twice as fast, etc.). This playback rate can be the same during time intervals when no timelines overlap in time, as seen in FIGS. 13A and 13B.

In some embodiments of the present invention, data-processing system 201 uses a playback rate during a time gap between timelines that is different from the playback rate that applies within one or more timelines. FIG. 13A depicts image 1350, which comprises timelines 1321-1 and 1321-2, non-overlapping in time with each other. Timeline 1321-1 corresponds to wireless terminal 101-1, represented by one or more position markers 1301-1. Timeline 1321-2 corresponds to wireless terminal 101-2, represented by one or more position markers 1301-2. Image 1350 further comprises playhead 622 positioned at the trailing (i.e., rightmost) end of timeline 1321-1. As playback at the moment being depicted is at the end of timeline 1321-1, position markers 1301-1-1 through 1301-1-8 show wireless terminal 101-1 leaving the displayed area of map 600. Alphanumeric time 623 is positioned accordingly and displaying a time of "08:24:19".

Figure 13A:
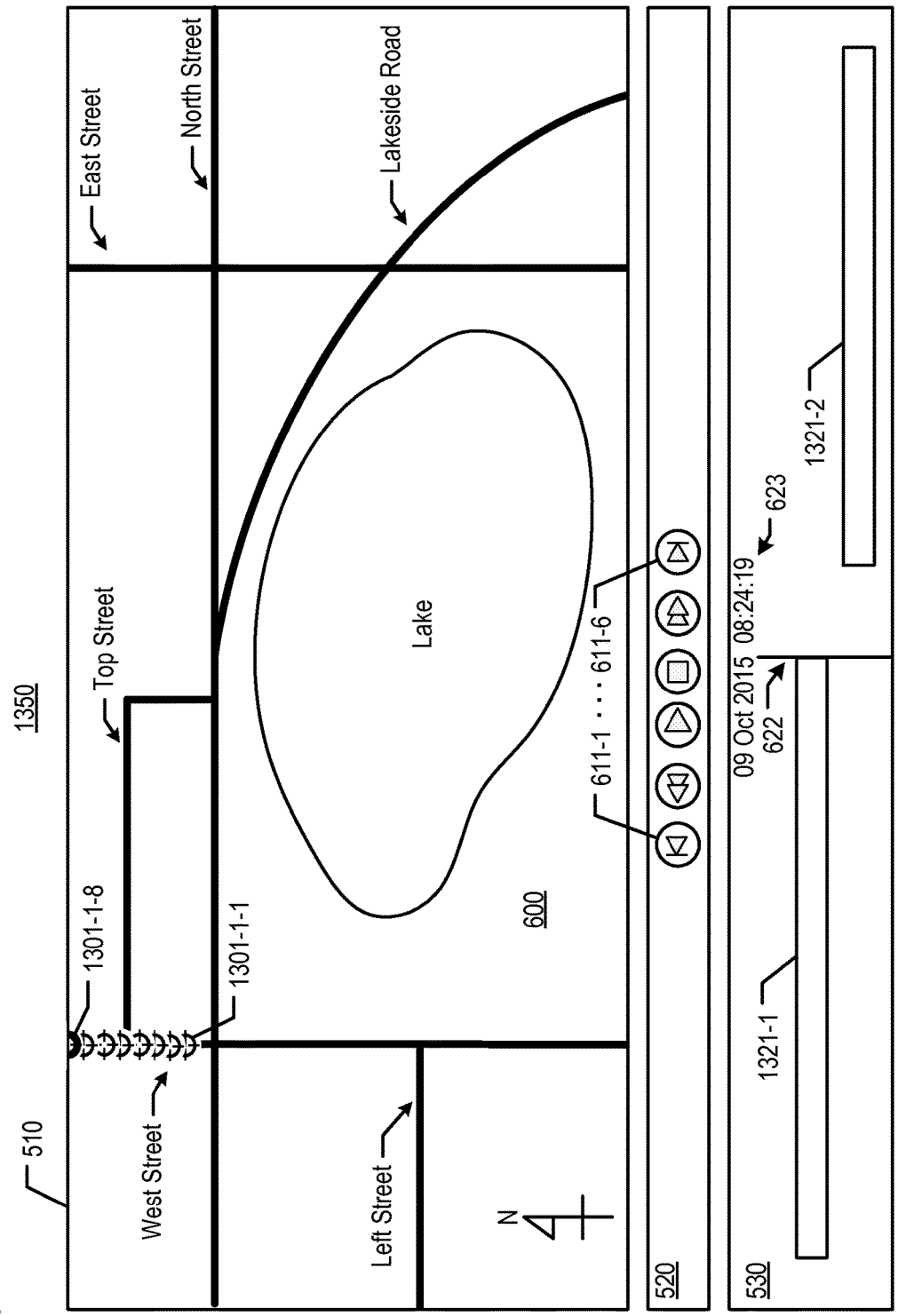
FIG. 13A depicts image 1350, which comprises playhead 622 positioned at the trailing (i.e., rightmost) end of timeline 1321-1.
Figure 13B:
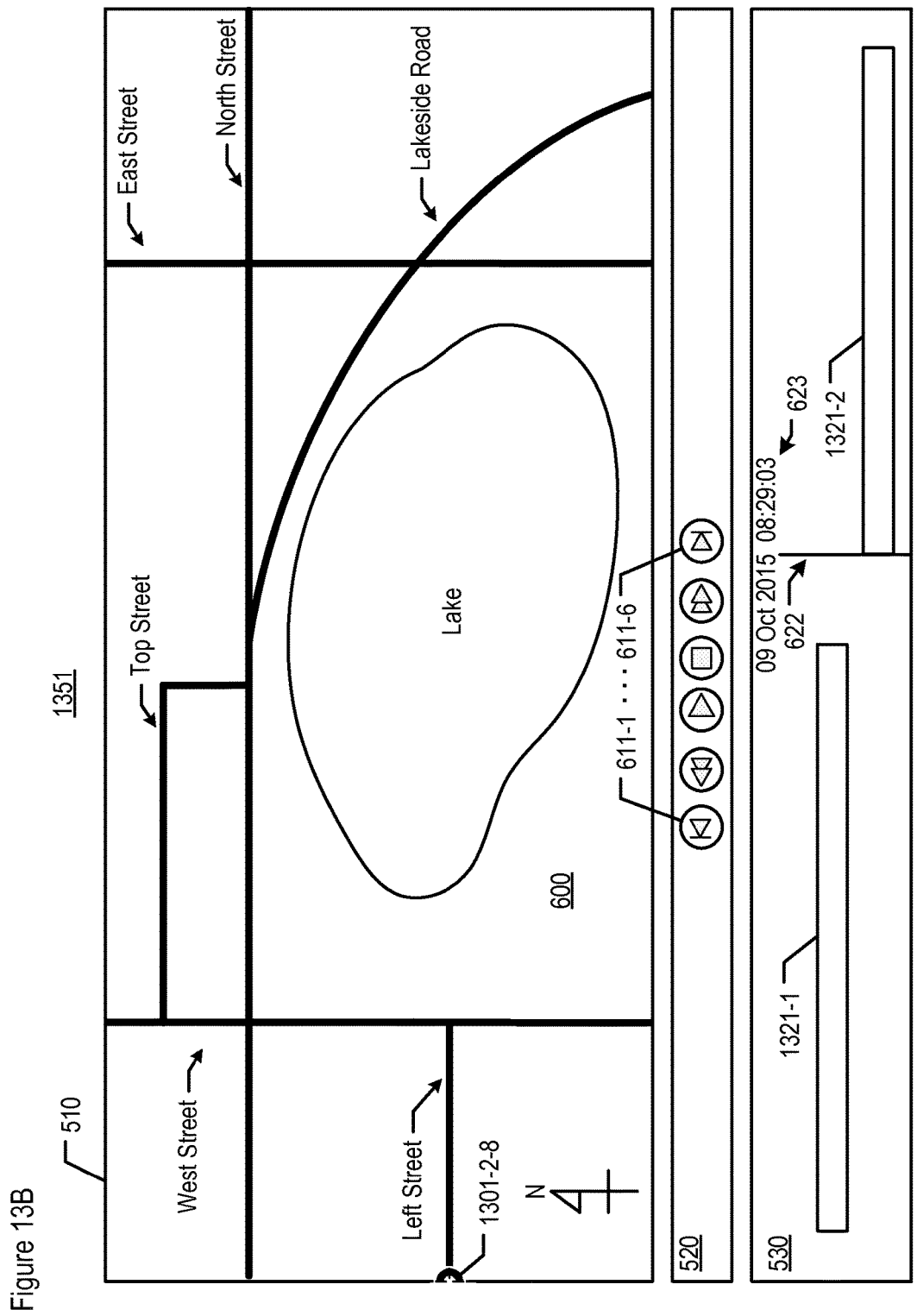
FIG. 13B depicts image 1351, which comprises playhead 622 positioned at the leading (i.e., leftmost) end of timeline 1321-2.

As data-processing system 201 continues to play back the displayed activities, it skips the displayed image ahead to that shown in FIG. 13B, which depicts image 1351 in which playhead 622 is skipped to a display position that is at the leading (i.e., leftmost) end of timeline 1321-2. As playback at the moment being depicted is at the beginning of timeline 1321-2, position marker 1301-2-8 shows wireless terminal 101-2 emerging onto the displayed area of map 600, where it will appear until the end of the timeline. Alphanumeric time 623 is updated in position accordingly and now displaying an updated time of "08:29:03", which corresponds to the skipped-to position on the timeline.

The example provided with respect to FIGS. 13A and 13B pertain to two different objects of interest. As those who are skilled in the art will appreciate after reading this specification, however, the two timelines can pertain to the same object of interest that appears on map 600 during two separate time durations. Furthermore, in some embodiments of the present invention, two timelines that are non-overlapping in time can be displayed in pane 530 such that any gap in the display area between the two timelines is removed, thereby facilitating the presentation of more timeline information within a given display space.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving, by a data-processing system, data that are representative of i) a series of plural geolocations of a first object and ii) a series of times that represent when the first object was at the respective geolocations;
generating, by the data-processing system, a first series of positions in relation to a map of a predetermined geographic region, wherein the positions in the first series of positions are based on the respective geolocations in the series of geolocations of the first object;
receiving a first command, by the data-processing system; and
displaying on a display, based on the receiving of the first command,
  i) the map,
  ii) markers for the first object that are representative of a subset of the positions in the first series such that the markers are superimposed on the map and comprise at least a leading marker and a trailing marker,
  iii) a first timeline that represents a duration of activity of the first object, wherein the first timeline is a graphic representation of the passage of time in the form of a rectangle having a first end and a second end, wherein the first end of the rectangle corresponds to the time at which markers corresponding to the activity of the first object first appear on the map, wherein the first series of positions represents the activity of the first object, and
  iv) a first indication of the time, determined from the series of times, at which the first object was at a particular geolocation that corresponds to a particular position, in the first series of positions, that is being represented on the map by the leading marker;
wherein the displaying of the markers for the first object advances the markers sequentially along the positions in the first series such that the markers appear to move around the map, corresponding to movement of the first object along the respective geolocations, wherein a constant number of markers N is displayed for the first object as the markers for the first object appear to move around the map, wherein the leading marker disappears first from the display and the trailing marker disappears last from the display when the markers appear to move off of the map, and wherein the first indication is updated as the markers are advanced along the positions.

2. The method of claim 1 wherein the position of first indication being displayed is coincident to a position on the first timeline that corresponds to the particular position that is being displayed on the map.

3. The method of claim 1 wherein the first indication is in the form of a playhead that appears superimposed on the first timeline when the first object is appearing on the map.

4. The method of claim 3 further comprising:
detecting, by the data-processing system, that the playhead is being dragged along the first timeline; and
updating, by the data-processing system, the markers being displayed on the map in regard to the subset of positions being represented, based on the particular time along the first timeline to which the playhead is being dragged.

5. The method of claim 1 further comprising:
receiving, by the data-processing system, data that are representative of a series of plural geolocations of a second object;
generating, by the data-processing system, a second series of positions in relation to the map, wherein the positions in the second series of positions are based on the respective geolocations in the series of geolocations of the second object; and
displaying, on the display, markers for the second object that are representative a subset of positions in the second series of positions such that the markers of the positions in the second series are superimposed on the map concurrently with the markers of the positions in the first series and appear to move around the map;
wherein the constant number of markers N is also displayed for the second object as the markers for the second object appear to move around the map; and
wherein the markers for the first object are spaced farther apart than the markers for the second object when the first object is moving faster than the second object at their respective geolocations.

6. The method of claim 5 further comprising displaying, on the display, a second timeline that represents a duration of activity of the second object, wherein the activity of the second object is represented, at least in part, by the second series of positions on the map.

7. A method comprising:
receiving, by a data-processing system, data that are representative of i) a series of plural geolocations of a first object and ii) a series of times that represent when the first object was at the respective geolocations;
generating, by the data-processing system, a first series of positions in relation to a map of a predetermined geographic region, wherein the positions in the first series of positions are based on the respective geolocations in the series of geolocations of the first object; and
displaying, on a display,
 i) the map in a first display pane,
 ii) markers for the first object that are representative of a subset of the positions in the first series such that the markers are superimposed on the map and comprise at least a leading marker and a trailing marker,
 iii) a first timeline in a second display pane different from the first display pane, wherein the first timeline represents a duration of activity of the first object, wherein the first timeline is a graphic representation of the passage of time and having a first end and a second end, wherein the first end corresponds to the time at which markers corresponding to the activity of the first object first appear on the map, and wherein the first series of positions represents the activity of the first object, and
 iv) a first indication of the time, determined from the series of times, at which the first object was at a particular geolocation that corresponds to a particular position, in the first series of positions, that is being represented on the map by the leading marker;
wherein the displaying of the markers for the first object advances the markers sequentially along the positions in the first series such that the markers appear to move around the map, corresponding to movement of the first object along the respective geolocations, wherein a constant number of markers N is displayed for the first object as the markers for the first object appear to move around the map, wherein the leading marker disappears first from the display and the trailing marker disappears last from the display when the markers appear to move off of the map, and wherein the first indication is updated as the markers are advanced along the positions.

8. The method of claim 7 wherein the first indication is in the form of a playhead that appears superimposed on the first timeline when the first object is appearing on the map.

9. The method of claim 8 further comprising:
detecting, by the data-processing system, that the playhead is being dragged along the first timeline; and
updating, by the data-processing system, the markers being displayed on the map in regard to the subset of positions being represented, based on the particular time along the first timeline to which the playhead is being dragged.

10. The method of claim 7 further comprising:
receiving, by the data-processing system, data that are representative of a series of plural geolocations of a second object;
generating, by the data-processing system, a second series of positions in relation to the map, wherein the positions in the second series of positions are based on the respective geolocations in the series of geolocations of the second object; and
displaying, on the display, markers for the second object that are representative of a subset of positions in the second series of positions such that the markers of the positions in the second series are superimposed on the map and appear to move around the map;
wherein the constant number of markers N is also displayed for the second object as the markers for the second object appear to move around the map; and
wherein the markers for the first object are spaced farther apart than the markers for the second object when the first object is moving faster than the second object at their respective geolocations.

11. The method of claim 10 further comprising displaying, on the display, a second timeline that represents a duration of activity of the second object, wherein the second series of positions represents the activity of the second object.

12. The method of claim 7 further comprising displaying, on the display, an alphanumeric representation of the time, determined from the series of times, at which the first object was at the particular geolocation that corresponds to the particular position, in the first series of positions, that is being represented on the map by the leading marker, wherein the alphanumeric representation is updated as the markers are advanced along the positions.

13. The method of claim 12 wherein the alphanumeric representation comprises both a numeric time value and a date value.

14. The method of claim 7 wherein the leading marker appears first on the display and the trailing marker appears last on the display when the markers appear to move onto the map.

15. A method comprising:
receiving, by a data-processing system, data that are representative of i) a series of plural geolocations of a first object and ii) a series of times that represent when the first object was at the respective geolocations;
generating, by the data-processing system, a first series of positions in relation to a map of a predetermined geographic region, wherein the positions in the first series of positions are based on the respective geolocations in the series of geolocations of the first object; and displaying, on a display,
i) the map in a first display pane,
ii) markers for the first object that are representative of a subset of the positions in the first series such that the markers are superimposed on the map and comprise at least a leading marker and a trailing marker,
iii) a first timeline in a second display pane different from the first display pane, wherein the first timeline represents a duration of activity of the first object, wherein the first timeline is a graphic representation of the passage of time and having a first end and a second end, wherein the first end corresponds to the time at which markers corresponding to the activity of the first object first appear on the map, and wherein the first series of positions represents the activity of the first object, and
iv) an alphanumeric representation of the time, determined from the series of times, at which the first object was at a particular geolocation that corresponds to a particular position, in the first series of positions, that is being represented on the map by the leading marker;
wherein the displaying of the markers for the first object advances the markers sequentially along the positions in the first series such that the markers appear to move around the map, corresponding to movement of the first object along the respective geolocations, wherein a constant number of markers N is displayed for the first object as the markers for the first object appear to move around the map, wherein the leading marker disappears first from the display and the trailing marker disappears last from the display when the markers appear to move off of the map, and wherein the alphanumeric representation is updated in regard to its alphanumeric value as the markers are advanced along the positions.

16. The method of claim 15 further comprising displaying, on the display, a second indication of the time, determined from the series of times, at which the first object was at the particular geolocation that corresponds to the particular position, in the first series of positions, that is being represented on the map by the leading marker.

17. The method of claim 16 wherein the second indication is in the form of a playhead that appears superimposed on the first timeline when the first object is appearing on the map, wherein the alphanumeric representation of the time and the playhead are maintained in their display positions with respect to each other.

18. The method of claim 17 further comprising:
detecting, by the data-processing system, that the playhead is being dragged along the first timeline; and
updating, by the data-processing system, the markers being displayed on the map in regard to the subset of positions being represented, based on the particular time along the first timeline to which the playhead is being dragged.

19. The method of claim 15 further comprising:
receiving, by the data-processing system, data that are representative of a series of plural geolocations of a second object;
generating, by the data-processing system, a second series of positions in relation to the map, wherein the positions in the second series of positions are based on the respective geolocations in the series of geolocations of the second object; and
displaying, on the display, markers for the second object that are representative of a subset of the positions in the second series of positions such that the markers of the positions in the second series are superimposed on the map concurrently with the markers of the positions in the first series and appear to move around the map;
wherein the constant number of markers N is also displayed for the second object as the markers for the second object appear to move around the map; and
wherein the markers for the first object are spaced farther apart than the markers for the second object when the first object is moving faster than the second object at their respective geolocations.

20. The method of claim 19 further comprising displaying, on the display, a second timeline that represents a duration of activity of the second object, wherein the second series of positions represents the activity of the second object.

21. The method of claim 15 wherein the alphanumeric representation comprises both a numeric time value and a date value, wherein at least one of the numeric time value and date value is updated in regard to its value as the markers are advanced along the positions.

22. The method of claim 15 wherein the leading marker appears first on the display and the trailing marker appears last on the display when the markers appear to move onto the map.

23. The method of claim 1 further comprising displaying, on the display, an alphanumeric representation of the time, determined from the series of times, at which the first object was at the particular geolocation that corresponds to the particular position, in the first series of positions, that is being represented in the map by the leading marker, wherein the alphanumeric representation is updated as the markers are advanced along the positions.

24. The method of claim 23 wherein the alphanumeric representation comprises both a numeric time value and a date value.

25. The method of claim 1 wherein the leading marker appears first on the display and the trailing marker appears last on the display when the markers appear to move onto the map.

* * * * *